(12) United States Patent
Huang (10) Patent No.: US 8,425,362 B2
(45) Date of Patent: Apr. 23, 2013

(54) INNER GEAR RING WITH VARIABLE TOOTH-NUMBER, THE METHOD OF VARYING THE TOOTH-NUMBER, AND A VARIABLE TRANSMISSION USING THE INNER GEAR RING

(76) Inventor: Qingpei Huang, Guangdong Province (CN)

(*) Notice: Subject to any disclaimer, the term of this patent is extended or adjusted under 35 U.S.C. 154(b) by 534 days.

(21) Appl. No.: 12/673,168

(22) PCT Filed: Aug. 23, 2007

(86) PCT No.: PCT/CN2007/002547
§ 371 (c)(1),
(2), (4) Date: Feb. 12, 2010

(87) PCT Pub. No.: WO2009/023992
PCT Pub. Date: Feb. 26, 2009

(65) Prior Publication Data
US 2011/0098148 A1 Apr. 28, 2011

(51) Int. Cl.
*F16H 9/26* (2006.01)
*F16H 3/44* (2006.01)
(52) U.S. Cl.
USPC .......................................... 475/182; 475/296

(58) Field of Classification Search .................... 475/182
See application file for complete search history.

(56) References Cited

U.S. PATENT DOCUMENTS

| | | | | |
|---|---|---|---|---|
| 2,101,845 A | * | 12/1937 | Fraser | 475/182 |
| 2,349,744 A | * | 5/1944 | Morgan | 475/182 |
| 5,406,863 A | * | 4/1995 | Korge | 74/439 |

* cited by examiner

*Primary Examiner* — Edwin A Young (57) ABSTRACT

A variable transmission comprises a main shift part and a shift mechanism. The main shift part comprises at least an inner gear ring (B) with variable tooth-number which is connected with the shift mechanism. Said inner gear ring (B) is composed of a number of teeth and a pair of tapered discs (7,8) which are coaxially with said gear ring and the teeth are inter-connected to form a curled rack (3). The two side surfaces of the inner gear ring (B) are closely contacted with the facing walls of the two tapered discs (7,8), therefore the inner gear ring (B) is maintained as a circular ring. The end of the rack (3) is connected to the shift mechanism, and the inner gear ring (B) is engaged with a main planetary gear train disposed coaxially. The transmission ratio of the main planetary gear train varies with the change of the tooth-number of the inner gear ring (B).

13 Claims, 12 Drawing Sheets

INNER GEAR RING WITH VARIABLE TOOTH-NUMBER, THE METHOD OF VARYING THE TOOTH-NUMBER, AND A VARIABLE TRANSMISSION USING THE INNER GEAR RING

BACKGROUND OF THE INVENTION

The present invention relates to a transmission device and its component, and more especially, to an inner gear ring with variable tooth-number, the method of varying the tooth-number, and a variable transmission for vehicle composed of the inner gear ring with variable tooth-number.

There are two types of transmissions: variable transmissions and continuously variable transmissions. Continuously variable transmissions can keep the motor in optimal working condition all the time so as to make the overall efficiency higher than the variable transmission. The existing continuously variable transmissions CVT, IVT both transfer power depend on friction, so they are inapplicable to high power, heavy-duty vehicles or machines. Moreover, due to the presence of abrasion, the service life is shorter than that of variable transmission. In the existing art, the variable transmission generally includes no more than 16 shift gears. With more shift gears, the structure becomes more complicated, and volume, weight and cost are higher. Furthermore, a clutch is required when shifting, and power interruption and loss may take place during shifting, so it is preferably not to design too many shifts.

BRIEF SUMMARY OF THE INVENTION

The present invention aims at providing an inner gear ring with variable tooth-number and a variable transmission using the inner gear ring with variable tooth-number which changes the transmission ratio of the planetary gear train through the tooth-number variation of the inner gear ring with variable tooth-number, thus to realize more steps of speeds than the existing multi-speed transmission.

The technical solution to realize the present invention is as follows: an inner gear ring with variable tooth-number, characterized in that: comprising a pair of tapered discs disposed coaxially and capable of changing axial distance through relative movement, wherein the inner walls of said two tapered discs are facing each other, a curled rack composed of several teeth is set between the two facing walls of the tapered discs, cogs are set on said teeth, the rear section of the rack consists of narrow teeth, the front section of the rack composed of wide teeth is provided with gear ring connecting interfaces for the access of the rear section of the rack, the rear section of the rack passing through the connecting interfaces forms a circular inner gear ring, the two side surfaces of the inner gear ring are closely contacted with the inner walls of the two tapered discs, the inner walls of the two tapered discs are provided with grooves fit for wide teeth, thus to make the inner gear ring formed maintain a circular ring shape, the tooth-number of the inner gear ring that the rear section of the rack is in or out of the inner gear ring through the gear ring connecting interfaces varies with the change of the relative distance of the two tapered discs.

The method of varying the tooth-number for the inner gearing with variable tooth-number of the present invention, is characterized in that, the inner gear ring is engaged with and driven by the outer planetary gear of the planetary gear train through revolution, the rear section of the rack is driven to push teeth into or draw teeth out from the inner gear ring after the outer planetary gear passes through the gear ring connecting interfaces during rotation, and meanwhile the two tapered discs are driven to make relative movement along the axial direction to change the adjacent distance, so as to ensure that the inner gear ring is contacted with the inner walls of the tapered discs all the time, and closely contacted between the facing walls of the tapered discs in the form of circular ring shape, the increase or decrease of tooth-number of the inner gear ring is completed before the outer planetary gear rotates to the gear ring connecting interfaces for the next time.

With respect to the variable transmission using the inner gear ring with variable tooth-number of the present invention, its technical solution is as follows: it comprises a main shift part and a shift mechanism, the main shift part comprises at least an inner gear ring with variable tooth-number which is connected with the shift mechanism, the inner gear ring with variable tooth-number is engaged with a main planetary gear train disposed coaxially, the transmission ratio of the main planetary gear train varies with the change of the tooth-number of the inner gear ring.

The abovementioned inner gear ring with variable tooth-number is composed of several teeth and a pair of tapered discs disposed coaxially, wherein cogs are set on said teeth, the teeth connected mutually constitutes a curled rack, the rear section of the rack is narrow teeth, the front section is wide teeth on which gear ring connecting interfaces for the access of the narrow teeth are provided, the rear section of the rack passing through the connecting interfaces forms a circular inner gear ring, the two facing walls of the tapered discs are inward concave, the two side surfaces of the inner gear ring are closely contacted between the facing walls of the two tapered discs, and the inner walls of the tapered discs are provided with concave faces fit for the wide teeth, thus to make the inner gear ring form maintain a circular ring shape, the rear section of the rack is connected with the shift mechanism which drives the rear section of the rack to be in or out of the inner gear ring through the gear ring connecting interfaces so as to change the tooth-number of the inner gear ring.

The abovementioned main planetary gear train comprises a main sun gear, an inner planetary gear and an outer planetary gear, wherein the main sun gear is coaxially disposed between the tapered discs, the inner planetary gear is engaged with the main sun gear through the bracket of main planetary gear carrier, the shafts of the inner, outer planetary gears are articulated via the planetary gear connecting arm and the two gears keep engaged with each other, the outer planetary gear is engaged with the inner gear ring, the transmission ratio between the main planetary gear carrier and the main sun gear varies with the change of the tooth-number of the inner gear ring.

The outer planetary gear is directly engaged with the inner gear ring through the resistance generated by loads and rotating centrifugal force, or through a supporting mechanism.

Wherein, the supporting mechanism of the outer planetary gear consists of a supporting arm, a supporting sliding block and a supporting sliding rail; one end of the supporting arm is connected to the connecting arm of the planetary gear, the other end is articulated with the sliding block, the articulation is coaxial with the outer planetary gear; the supporting sliding rail and the shaft of the tapered discs are on the same face and the rail can rotate around the shaft of the tapered discs, the included angle between the supporting sliding rail and the shaft is equal to the semi-tapered angle with the inner walls of the tapered discs and moves axially with the tapered disc of the same side; the sliding block slides along the supporting sliding rail, and the outer planetary gear is engaged with the inner gear ring all the time.

The main sun gear of the variable transmission is connected with the power input part and the main planetary gear carrier is connected with the power output part, or vice versa.

A post planetary gear train is configured between the planetary gear train and power output part; the post planetary gear train is a single pinion type planetary gear train, and is composed of a sun gear, a gear ring and a planetary gear carrier; the main sun gear is connected with the sun gear, the main planetary gear carrier is linked with the gear ring; the main sun gear or main planetary gear carrier is connected with the power input part, the planetary gear carrier of the post planetary gear train is connected with the power output part.

A traction device is set between the shift mechanism and inner gear ring with variable tooth-number, wherein the traction device comprises a tooth guided grooved rail and a traction rod; the tooth guided grooved rail is arranged along the tangent direction of the inner gear ring and connected with the first tooth at the front section of the rack, and makes radial movement with the tooth; the traction rod is arranged on the plane of the shaft section in the center of the inner gear ring and along the direction with an arctan ($0.5/\pi$) angle with the tooth guiding grooved rail, and connected with the narrow teeth at the rear section of the rack, and moves along this direction under the traction of the shift mechanism; with the movement of the traction rod along the setting direction, the rear section of the rack through the gear ring connecting interfaces by means of drawing out or pushing in teeth is in or out of the inner gear ring via the sliding in the tooth guiding grooved rail, and drives the tooth guiding grooved rail to make radial movement along the first tooth at the front section of the rack so as to adapt to the change of the radius of the inner gear ring.

The shift mechanism is synchronous stepping shift mechanism. It comprises driver plates; round pins are configured on the driver plates; several grooves fit for the round pins are mounted on the traction rod, and the rotating diameter of the round pins is equal to the distance between the adjacent grooves.

The favorable effect of the present invention is that, the inner gear ring of the variable tooth-number adopts curled, open type flexible rack fit for the pair of tapered discs, so the change of tooth-number can be easily realized through pushing, drawing out the rear section of the rack, or through the transmission ratio between the self-rotation and revolution of the outer planetary gear of the planetary gear train engaged with the rack. While the variable transmission using the inner gear ring with variable tooth-number is provided with more steps of speeds than the existing multi-speed transmission. With the simple structure, the number of the steps of speeds can only affect the volume (no impact on the structure) and the shift over 16 steps can be easily achieved. Therefore, this variable transmission can make the motor maintain nearly the highest efficiency working condition all the time. Moreover, it is engaged type power transmission, so it can be applied in high power, heavy duty vehicles or machines, can realize shifting with low power loss and no power interruption, and the service life is also longer than friction type continuously variable transmission.

BRIEF DESCRIPTION OF THE DRAWINGS

The inner gear ring with variable tooth-number, the method of varying the tooth-number, and the variable transmission using the inner gear ring are explained hereinafter in combination with the drawings and the embodiments:

FIGS. 4 (*a*) and (*b*) show the conditions that the distance between the two tapered discs are the nearest, the radius of the inner gear ring is the minimum, the distance between the two tapered discs are the farthest, and the radius of the inner gear ring is the maximum respectively;

DETAILED DESCRIPTION OF THE INVENTION

Embodiment 1

With reference to FIGS. 1~8, the variable transmission disclosed by this Embodiment comprises a main shift part and a post planetary gear train 22, the main shift part is connected with the shift mechanism through the traction device, wherein the main shift part comprises an inner gear ring with variable tooth-number B, a main sun gear 11, an inner planetary gear 12, an outer planetary gear 13 and a main planetary gear carrier 14. The post planetary gear train 22 is a single pinion type (Simpson Type) and is composed of a sun gear 23, a gear ring 24 and a planetary gear carrier 25. The main planetary gear carrier 14 is linked with the power input part 20 and the gear ring 24 of the post planetary gear train 22, the main sun gear 11 is connected with the sun gear 23 of the post planetary gear train 22, the planetary gear carrier 25 of the post planetary gear train 22 is linked with the power output part 21.

As shown in FIGS. 1~4, the inner gear ring with variable tooth-number B comprises: a pair of tapered discs 7, 8 disposed coaxially and with two facing walls, and a curled rack 3 composed of teeth 1 linked mutually. The two tapered discs 7, 8 which (tapered discs 7, 8) are connected by screws 19 with opposite threads on both ends move along with the rotation of the screws 19 so as to change the distance between the two tapered discs 7, 8. Cogs 2 are set on said teeth 1. Both sides of the teeth are the inclined planes fit for the inner walls 9 of the tapered discs 7, 8. The rear section 5 of the rack 3 is composed of narrow teeth. The front section 4 of the rack 3 is provided with several wide teeth on which gear ring connecting interfaces A for the access of the narrow teeth are set, wherein the gear ring connecting interface A on the first to the fifth wide teeth is in the form of opening "n", the interface A on the sixth wide tooth is an enclosed block shape, the rear section 5 of the rack 3 constitutes the inner gear ring B after passing through the gear ring connecting interfaces A; wherein the cogs 2 of the narrow teeth are set in the middle of the teeth end face, the cogs 2 for several wide teeth at the gear ring connecting interfaces A are arranged on the left and right sides of the teeth end face, with a clearance equivalent to the width of the cogs 2 of the narrow teeth in the middle, so as to keep the integrity of the cogs at the gear ring connecting interfaces A for the inner gear ring 3. Concave faces 10 fit for the wide teeth are set in the inner walls 9 of the tapered discs 7, 8, the inner gear ring B is clamped between the inner walls 9 of the tapered discs 7, 8 and the concave faces 10 so as to maintain the circular ring shape.

Figure 1:
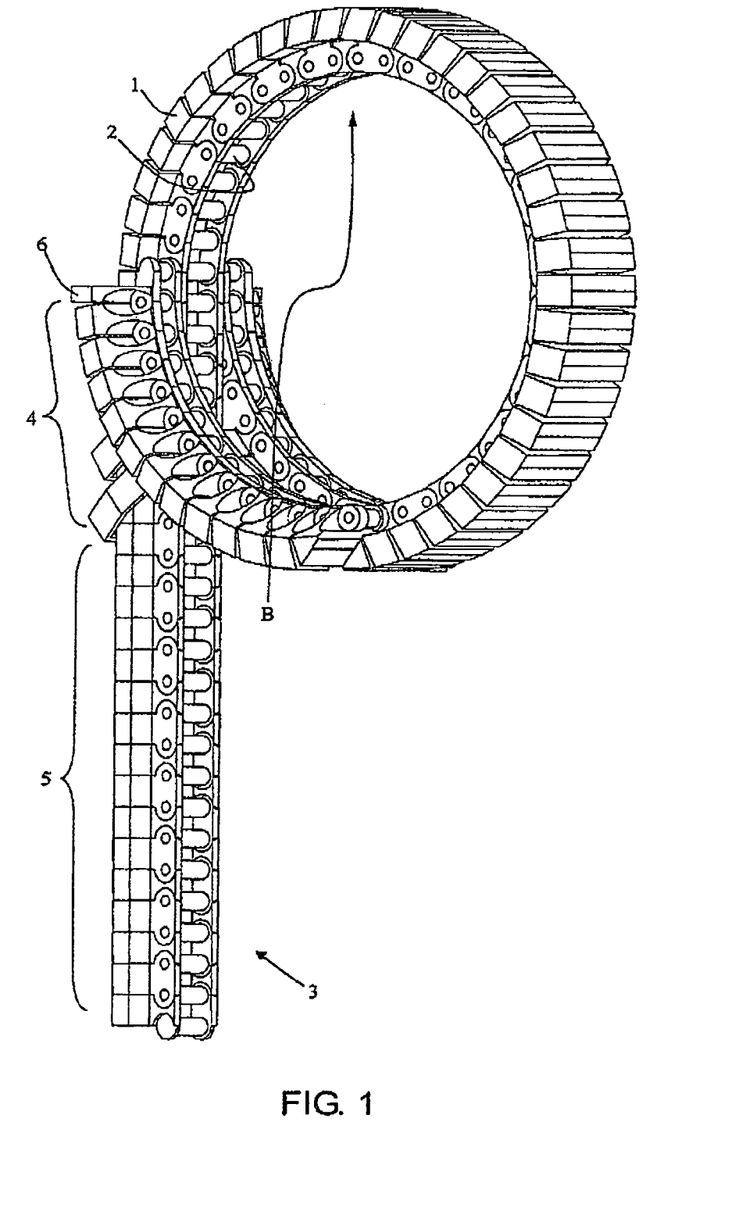
FIG. 1 shows the curled rack composed of the teeth.
Figure 2:
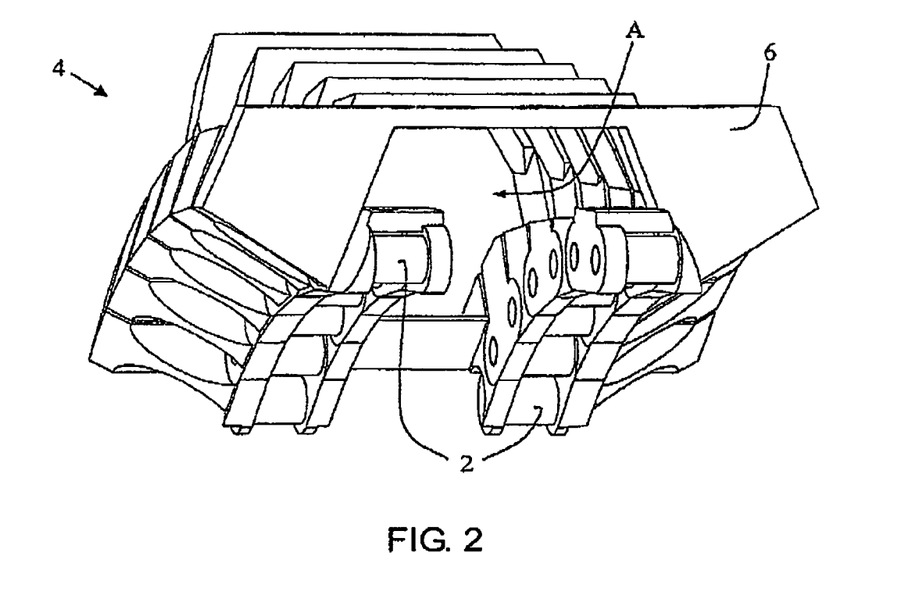
FIG. 2 shows the wide teeth at the front section of the rack and the gear ring connecting interfaces on the rack.
Figure 3:
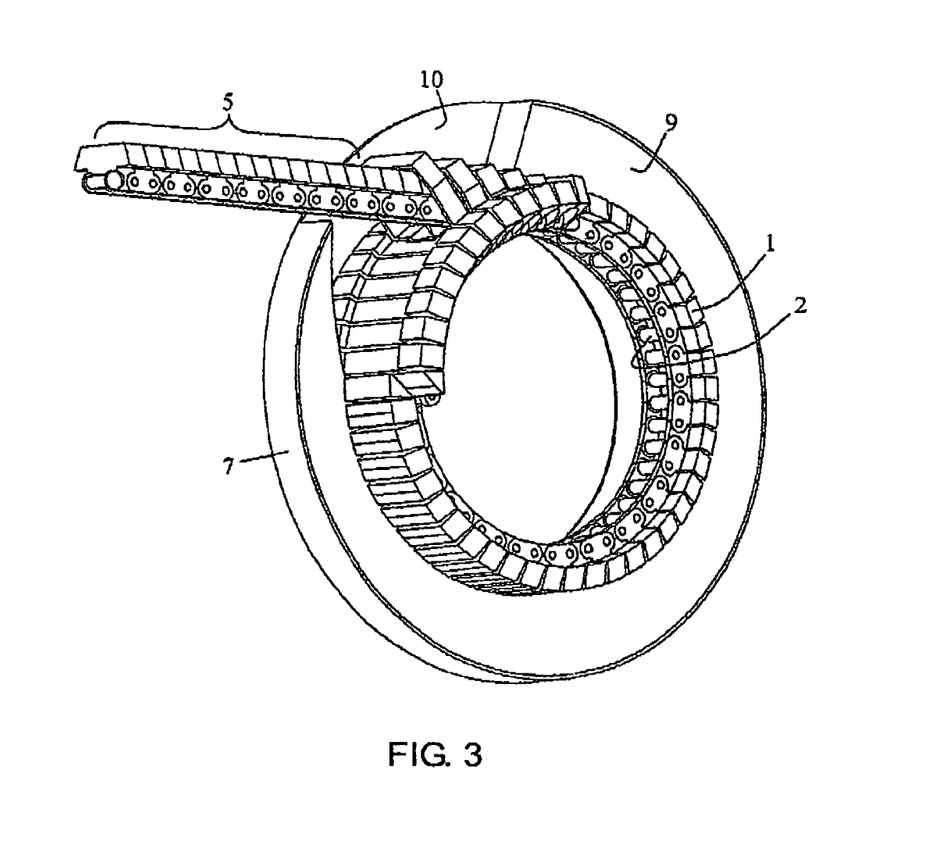
FIG. 3 shows the condition that the inner gear ring is coordinated with one tapered disc.
Figure 4:
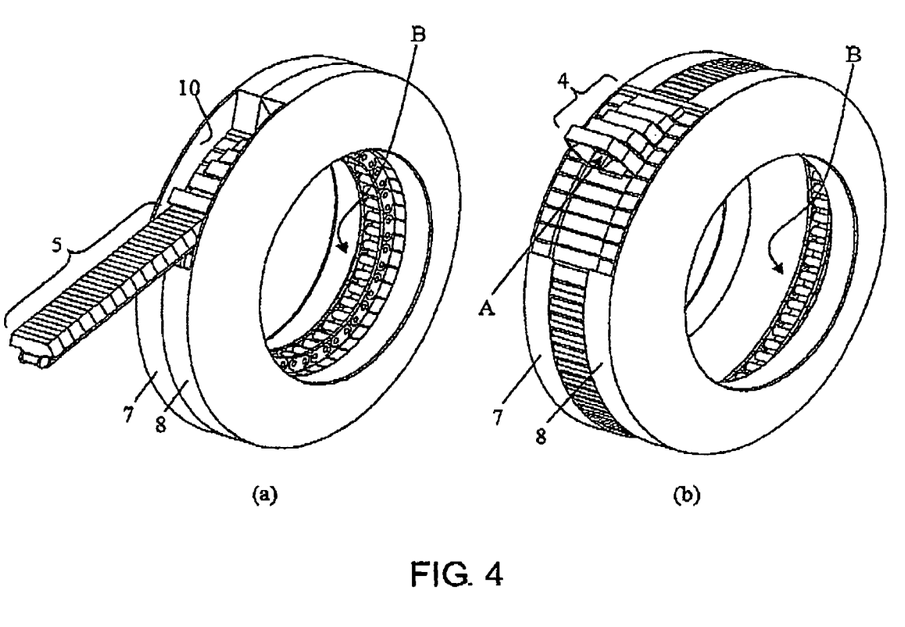
Figure 5:
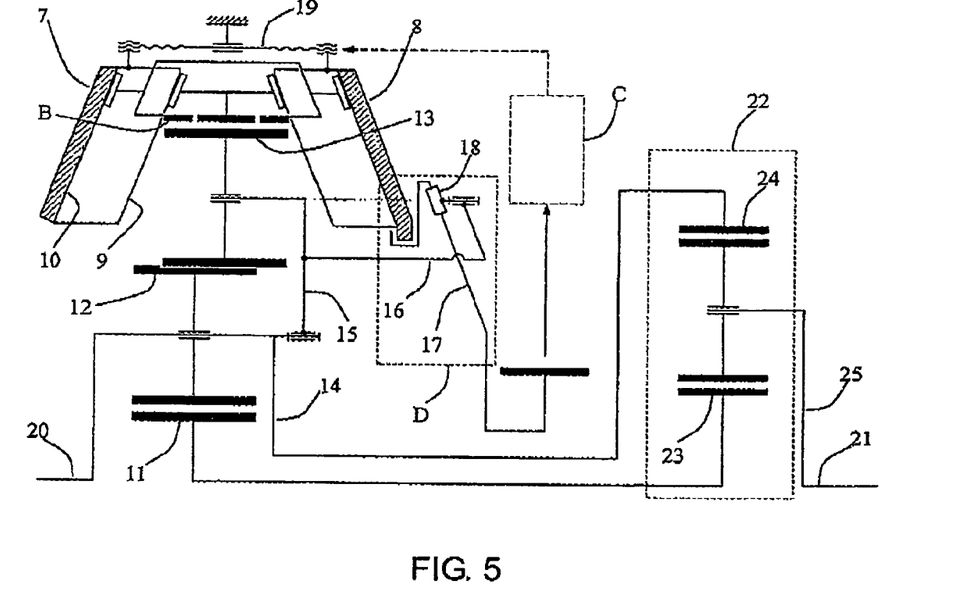
FIG. 5 is the brief cutaway view of the variable transmission along axial direction.
Figure 6:
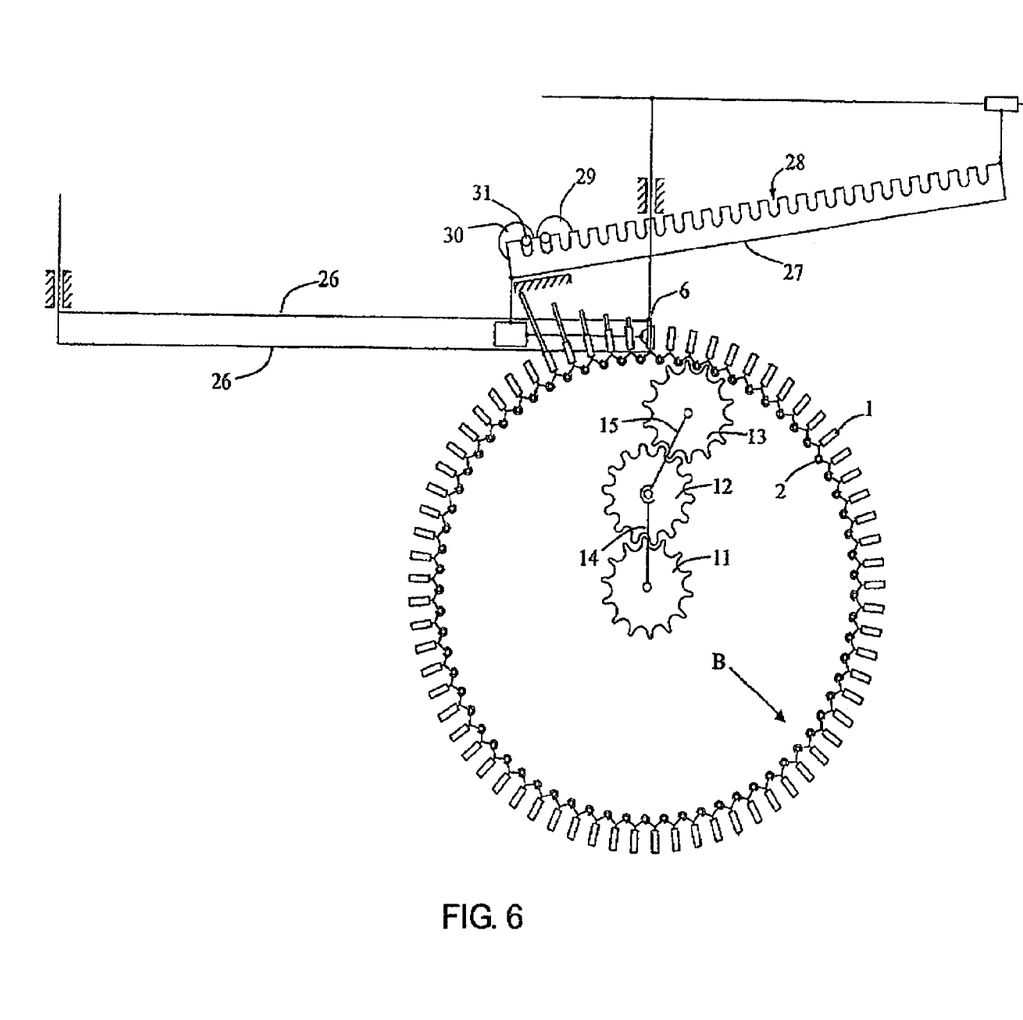
FIG. 6 is the brief view showing the location relations between the main planetary gear train and the tooth guiding grooved rail, traction rod when the inner gear ring is the maximum.
Figure 7:
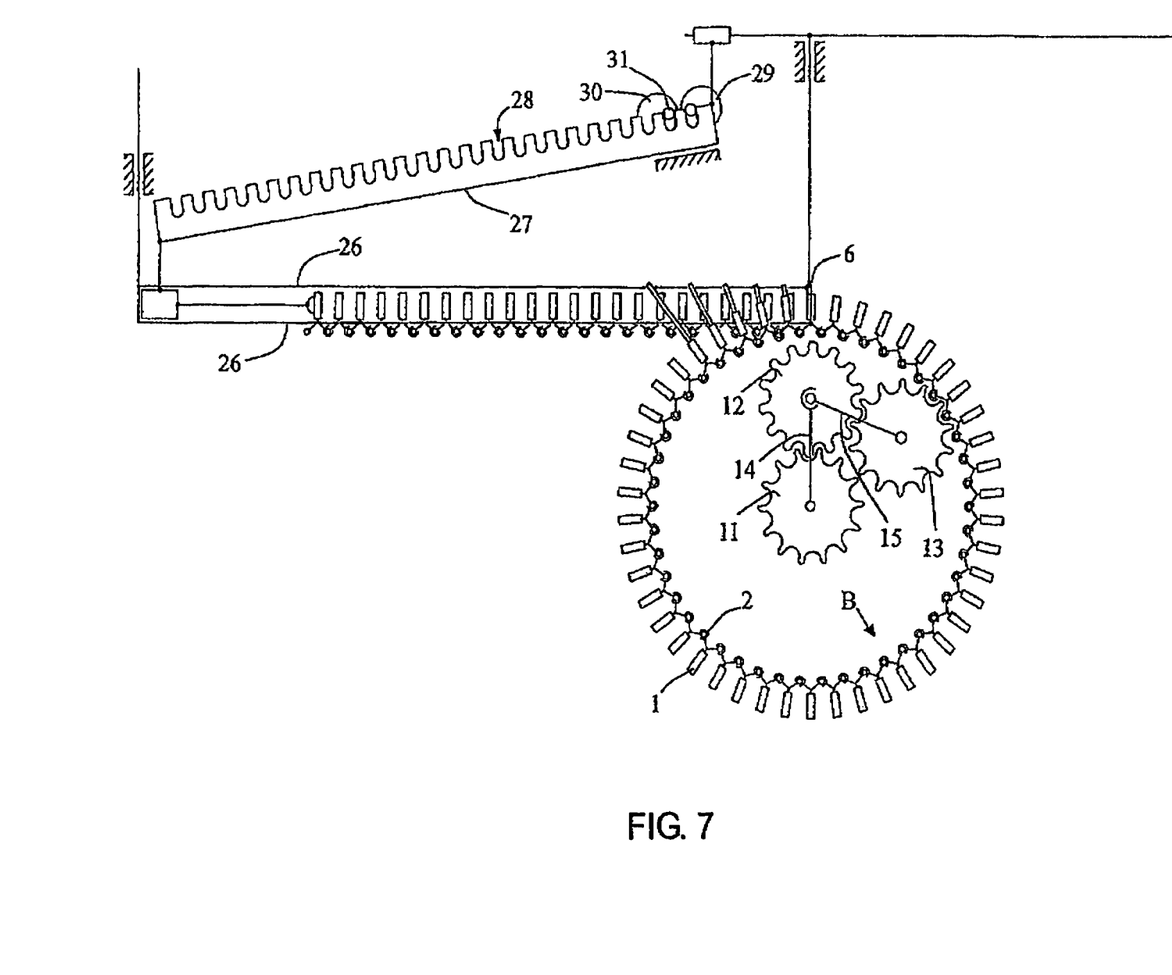
FIG. 7 is the brief view showing the location relations between the main planetary gear train and the tooth guiding grooved rail, traction rod when the inner gear ring is the minimum.

As shown in FIGS. 5~7, the main sun gear 11 is coaxially set between the two tapered discs 7, 8, the inner planetary gear 12 is engaged with the main sun gear 11 through the planetary gear carrier bracket 14; the connecting arm 15 of the planetary gear is articulated with the shafts of the outer, inner planetary gears 12, 13 respectively so as to keep the engagement of the inner, outer planetary gears 12, 13; the supporting mechanism of the outer planetary gear D is applied to keep the engagement of the outer planetary gear 13 with the inner gear ring B. When the outer planetary gear 13 passes through the gear ring section composed of narrow teeth, the cogs in the middle of the end face are engaged with the outer planetary gear 13; when the outer planetary gear 13 passes through the gear ring section composed of wide teeth at the gear ring connecting interfaces A, the cogs on both sides of the tooth end faces are engaged with the outer planetary gear 13; when the outer planetary gear 13 passes through the first wide tooth 6 of the gear ring connecting interfaces A, the outer planetary gear 13 is engaged with a cog in the middle of the narrow teeth and cogs on both sides of the wide tooth 6 simultaneously. Therefore, in the whole rotating period, the outer planetary gear 13 keeps engagement with the gear ring B, free from jump discontinuity.

As shown in FIG. 5, the supporting mechanism D of the outer planetary gear comprises a supporting arm 16, a supporting sliding block 18 and a supporting sliding rail 17; one end of the supporting arm 16 is connected to the connecting arm 15 of the planetary gear, the other end is articulated with the sliding block 18, the articulation is coaxial with the outer planetary gear 13; the supporting sliding rail 17 and the shaft of the tapered discs 7, 8 are on the same face and the rail can rotate around the shaft of the tapered discs 7, 8, the included angle between the supporting sliding rail and the shaft is equal to the semi-tapered angle with the inner walls of the tapered discs 7, 8 and moves axially with the tapered disc 8 of the same side; the sliding block 18 slides along the supporting sliding rail 17, so as to ensure that the outer planetary gear 13 is engaged with the inner gear ring B all the time.

Figure 8:
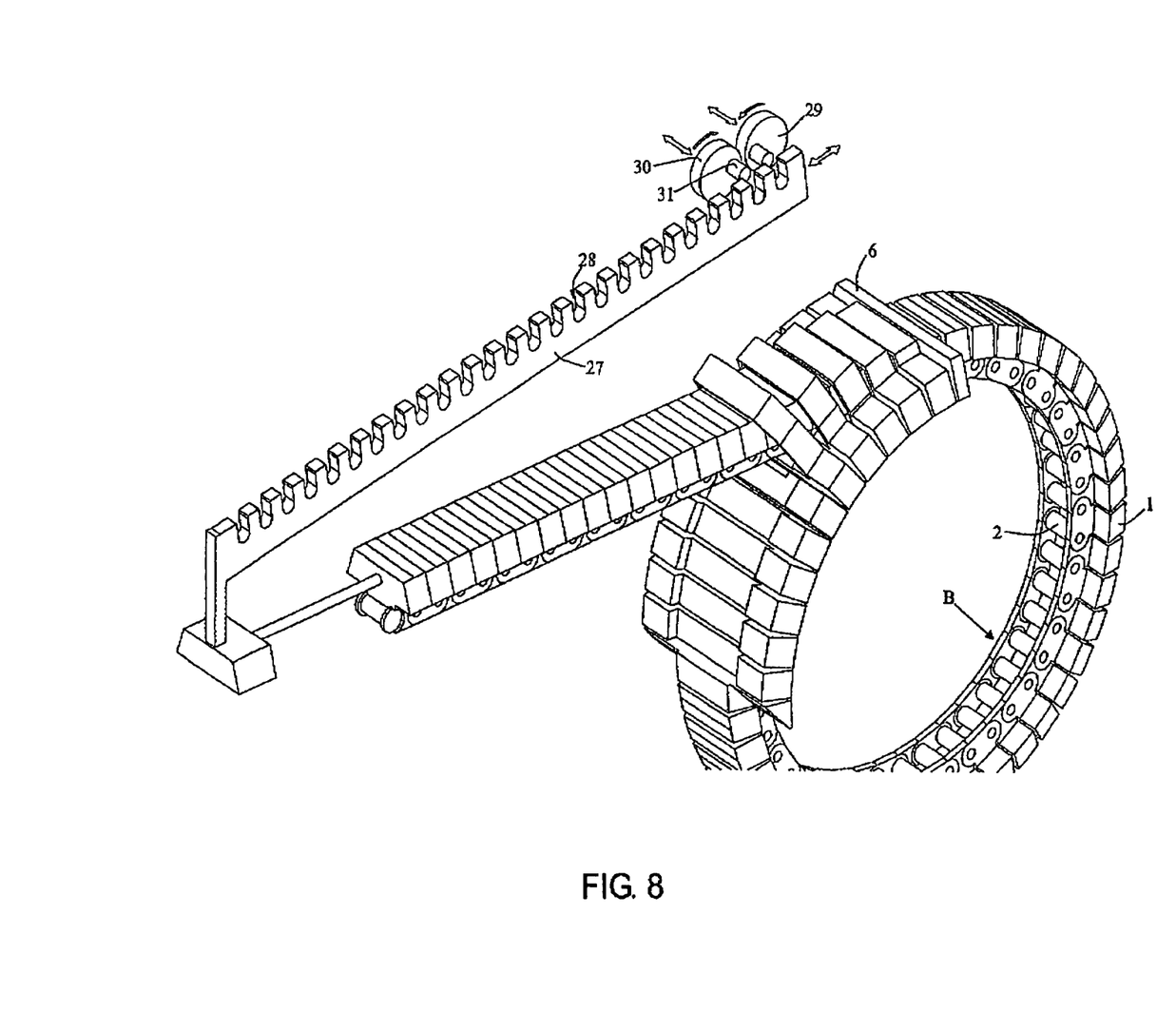
FIG. 8 shows the relations between the movements and locations of the traction rod, shift driver plates and rack.

Wherein, the traction device connecting the shift mechanism and inner gear ring with variable tooth-number B comprises a tooth guiding grooved rail 26 and a traction rod 27. As shown in FIGS. 6~8, the tooth guiding grooved rail 26 is arranged along the tangent direction of the inner gear ring B and connected with the first tooth 6 at the front section of the rack 3. The rear section 5 of the rack 3 passes through the gear ring connecting interfaces A, and slides in the tooth guiding grooved rail 26 so as to be in or out of the gear ring B. The tooth guiding grooved rail 26 can move radially along with the first tooth 6. The traction rod 27 is arranged on the plane of the shaft section in the center of the inner gear ring B and along the direction with an arctan ($0.5/\pi$) angle of about 9.043 with the tooth guiding grooved rail 26, and moves along this direction, wherein the traction rod 27 is connected with the last tooth at the rear section 5 of the rack 3; with the traction of the shift mechanism, the traction rod 27 moves along the setting direction, draws out from or pushes into the rear section 5 of the rack 3 to be in or out of the inner gear ring B, and drives the tooth guiding grooved rail 26 to make radial movement along the first tooth 6 so as to adapt to the change of the radius of the inner gear ring B. The screws 19 linking the two tapered discs 7, 8 rotate with the movement of the traction rod 27, thus changing the distance between the two tapered discs 7, 8.

Wherein, the shift mechanism is synchronous stepping shift mechanism C. It comprises driver plates 29, 30; round pins 31 are configured on the driver plates 29, 30; several grooves 28 are mounted on the traction rod 27, and the diameter of the round pins 31 rotating around the shift driver plates (29, 30) is equal to the distance between the adjacent shift grooves 28, the distance of the grooves 28=(teeth spacing of the inner gear ring B)$\times[1+1/(2\pi)^2]^{1/2}$, namely, the movement of traction rod 27 by a distance of grooves 28 just push or draw out a tooth into or from the inner gear ring B. The shift driver plates 29, 30 are driven by the rotation of the supporting sliding rail 17 around the shaft of the main sun gear 11, and the rotating speed of the shift driver plates 29, 30 is a half of that of the supporting sliding rail 17 (=½ of the quantity of outer planetary gears). When the outer planetary gear 13 passes through the first tooth 6 of the gear ring connecting interface A, the round pins 31 are just at the position aligning with the opening of the grooves 28; two shift driver plates 29, 30 can make axial movement through a mechanical or electromagnetic device. When the shift driver plates 29, 30 are in the original location, the round pins 31 are not in contact with the traction rod 27. As shown in FIG. 8, the rotating directions of the two shift driver plates 29, 30 are opposite. When the driver plate 29 rotates clockwise and the traction rod 27 work, the traction rod 27 moves in top-right direction as shown in FIG. 8; when the driver plate 30 rotates anticlockwise and the traction rod 27 work, the traction rod 27 moves in bottom-left direction as shown in FIG. 8. Therefore, when shifting is required, the shift driver plate 29 or 30 is pushed to the traction rod 27 through a mechanical or electromagnetic device, with the rotation of the driver plate 29 or 30, the round pins 31 enter into the grooves 28 to poke the traction rod 27 for movement, after the round pins 31 rotates out from the grooves 28, the shift driver plate 29 or 30 returns to the original location, round pins 31 deviate from the traction rod 27; during the shifting above, after the outer planetary gear 13 passes through the first tooth 6 of the gear ring connecting interfaces A, the traction rod 27 is moved to push or draw out teeth into or from the inner gear ring B, and drives the screws 19 to rotate to change the distance between the two tapered discs 7, 8. Before the outer planetary gear 13 passes through the first tooth 6 of the gear ring connecting interfaces A for the next time, the following are completed: increase or decrease the tooth-number of the inner gear ring B, and change the relative distance between the two tapered discs 7, 8, keep the inner gear ring B in contact with the inner walls of the tapered discs 7, 8 and maintain circular ring shape.

As shown in FIGS. 6, 7, the tooth-number of the main sun gear 11 $Z_{11}=14$, that of both the inner planetary gear 12 and outer planetary gear 13 is 14, and the tooth-number $Z_B$ of the inner gear ring B is at least 46, 69 at most. Suppose the tooth-number of the gear ring for the post planetary gear train is $Z_{24}$ and that of the sun gear for the post planetary gear train is $Z_{23}$, if:

$$(49-Z_{11})/Z_{11} > (Z_{24}/Z_{23}) > (48-Z_{11})/Z_{11}$$

When the tooth-number of the inner gear ring is 49~69, the output and input rotating directions are opposite, 21 steps of speeds are available, which will be used as forward shifts; when the tooth-number of the inner gear ring B is 46~48, the output and input rotating directions are the same, 3 steps of speeds are available, which will be used as the reverse shift.

If the tooth-number of the gear ring 24 for the post planetary gear 22 $Z_{24}$=40 and that of the sun gear 23 for the post planetary gear 22 $Z_{23}$=16, when the tooth-number of the inner gear ring B is 50~69, they are the $1^{st}$~$20^{th}$ forward shifts respectively; when the tooth-number of the inner gear ring B is 48, 47, 46, they are the $1^{st}$~$3^{rd}$ reverse shifts respectively; when the tooth-number of the inner gear ring B is 49, it is shift "0", namely, brake for locking, at this time, the output speed keeps 0 no matter how much rotating speed you input. The transmission ratio of various shifts is:

Input rotating speed/output rotating speed=$Z_{11}(Z_{11}$-tooth-number of inner gear ring×$Z_{23}$/($Z_{23}$+$Z_{24}$))=14/(14-(49+shift level number)×16/56)=-49/shift level number.

Wherein: forward shift levels are 1, 2, 3 . . . 20; reverse shift levels are -1, -2 and -3.

The negative value of the transmission ratio shows the opposite directions of input and output rotation. Therefore, the ratio of the first level and the $20^{th}$ level of forward shift is 20 times. Due to the multiple shifts, the difference of output rotating speeds between adjacent shifts is slim, so the variable transmission can realize direct shifting without the coordination of the clutch during medium or high speed, except the starting stage. Springs are used to buffer shifting impact, so as to achieve low-loss shifting without power interruption.

Embodiment 2

Figure 10:
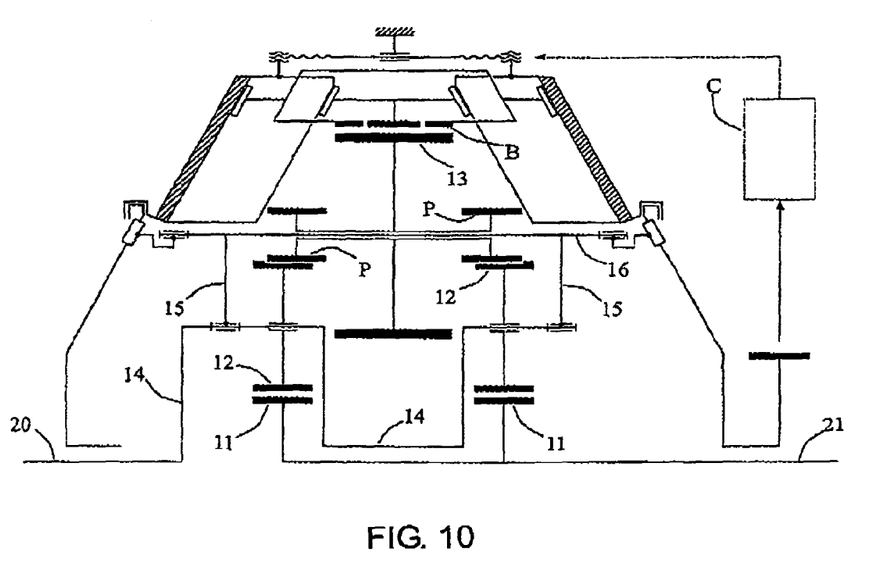
FIG. 10 is the brief cutaway view of Embodiment 2 along axial direction.
Figure 11:
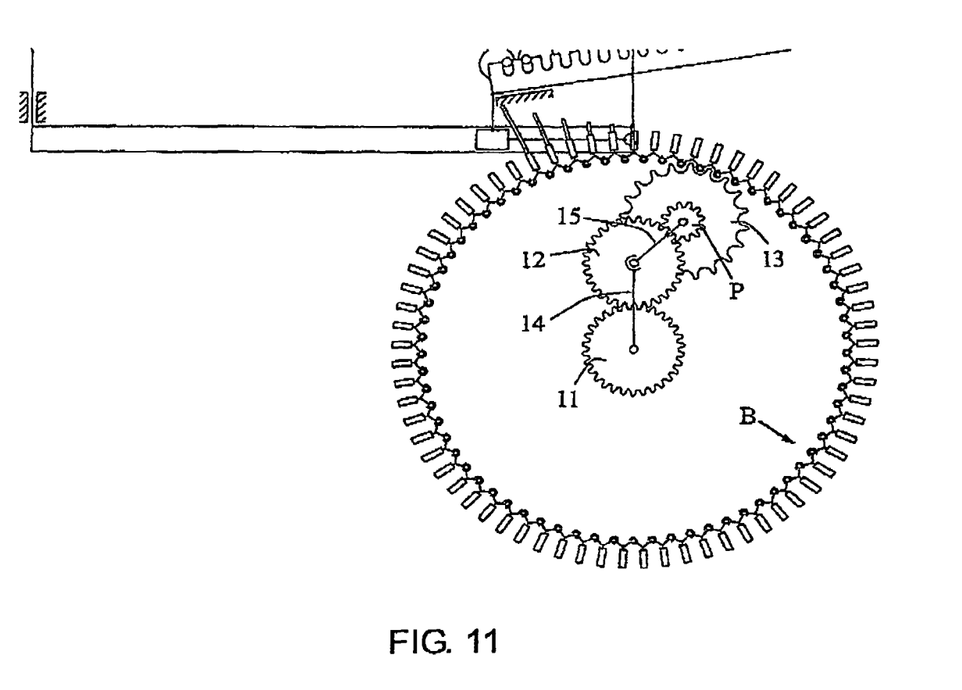
FIG. 11 is the brief view showing the location relations of the main sun gear, inner planetary gear, outer planetary gear and pinion (P) when the inner gear ring in Embodiment 2 is the maximum.
Figure 12:
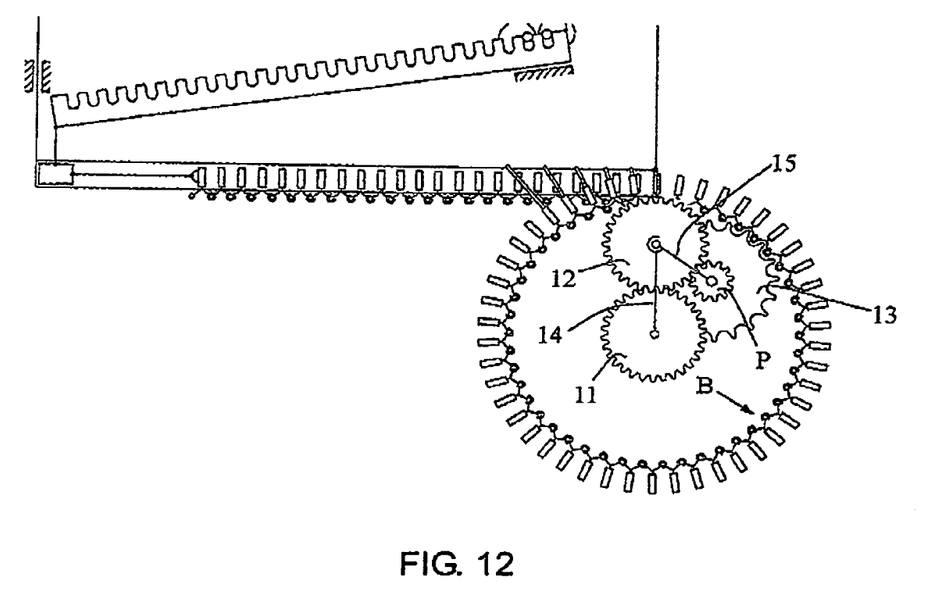
FIG. 12 is the brief view showing the location relations of the main sun gear, inner planetary gear, outer planetary gear and pinion (P) when the inner gear ring in Embodiment 2 is the minimum.

As shown in FIGS. 10~12, the difference between the variable transmission of this Embodiment and that in Embodiment 1 is the lack of rear-mounted planetary gear train. The transmission in this Embodiment comprises an inner gear ring B with variable tooth-number and a planetary gear train coaxially disposed inside, wherein the planetary gear train is composed of a main sun gear 11, an inner planetary gear 12 and an outer planetary gear 13. The main sun gear 11 is coaxially disposed between the pair of tapered discs 7, 8, and the inner planetary gear 12 is engaged with the main sun gear 11 through the bracket of the main planetary gear carrier 14; the outer planetary gear 13 is provided with pinions P coaxially connected; the shafts of the inner, outer planetary gears 12, 13 are articulated with each other through the connecting arm 15 of the planetary gear, and the inner planetary gear 12 keeps engagement with the pinions P; the outer planetary gear 13 is engaged with the inner gear ring B; the main planetary gear carrier 14 is linked with the power input part 20, and the main sun gear 11 is connected with the power output part 21.

Suppose the tooth-number of the inner gear ring B is $Z_B$, that of the outer planetary gear 13 is $Z_{13}$, that of the main sun gear 11 is $Z_{11}$ and that of the pinions P is $Z_P$, then:

When $Z_B/Z_{13}$>$Z_{11}/Z_P$, the directions of the input and output rotation are opposite, which are used as the forward shift;

When $Z_B/Z_{13}$<$Z_{11}/Z_P$, the directions of the input and output rotation are the same, which are used as the reverse shift;

When $Z_B/Z_{13}$=$Z_{11}/Z_P$, the output rotation keeps 0, which is used as brake for locking.

If the tooth-number $Z_B$ of the inner gear ring B takes 46~69, that of the outer planetary gear 13 $Z_{13}$=20, that of the main sun gear 11 $Z_{11}$=30, that of the pinions P $Z_P$=12: when $Z_B$ is 51~69, $Z_B/Z_{13}$>$Z_{11}/Z_P$, the directions of the input and output rotation are opposite, 19 steps of speeds are available, which are used as the forward shift; when $Z_B$ is 46~49, $Z_B/Z_{13}$<$Z_{11}/Z_P$, the directions of the input and output rotation are the same, 4 steps of speeds are available, which are used as the reverse shift; when $Z_B$=50, it is shift "0", namely, brake for locking, at this time, the output speed keeps 0 no matter how much rotating speed you input. The transmission ratio of various shifts is:

Input rotating speed/output rotating speed=1/(1-($Z_P$×$Z_B$)/($Z_{11}$×$Z_{13}$))=1/(1-(12×(50+shift level number)/(30×20))=-50/shift level number.

Wherein: forward shift levels are 1, 2, 3 . . . 19; reverse shift levels are -1, -2, -3 and -4; the negative value of the transmission ratio shows the opposite directions of input and output rotation. The ratio of the first level and the $19^{th}$ level of forward shift is 19 times. Due to the multiple shifts, the difference of output rotating speeds between adjacent shifts is slim, so the variable transmission can realize direct shifting without the coordination of the clutch during medium or high speed, except starting stage as described in Embodiment 1. Torque springs are used to buffer shifting impact, so as to achieve low-loss shifting without power interruption.

Embodiment 3

Figure 9:
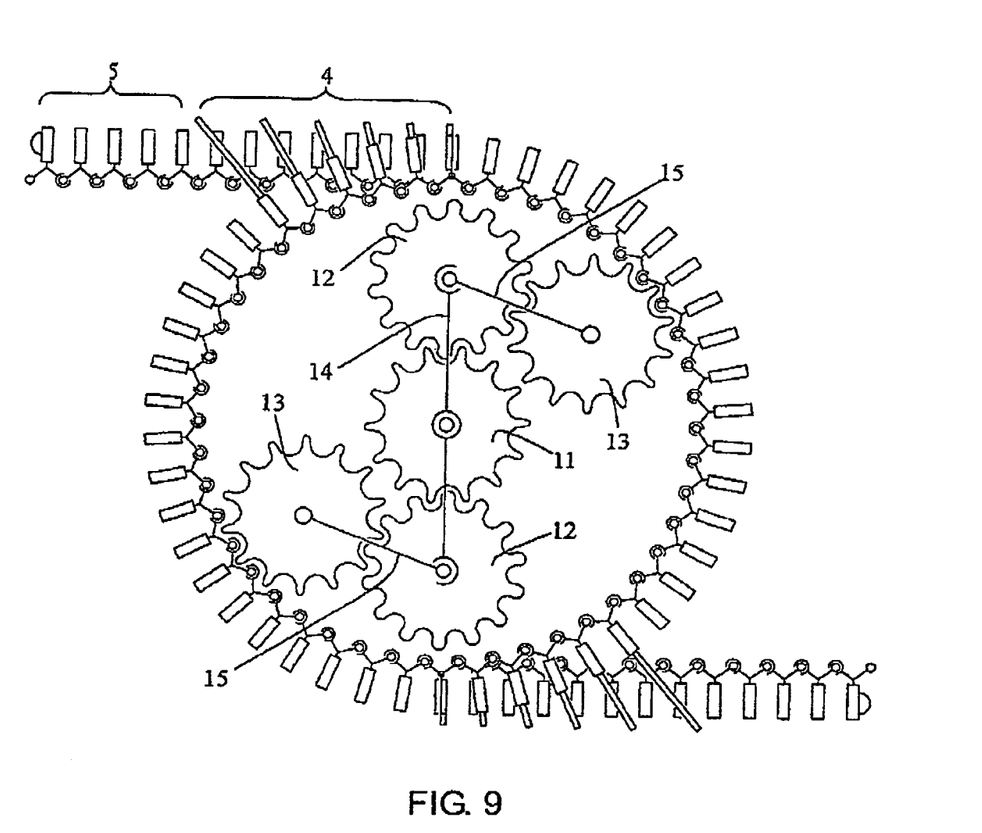
FIG. 9 is the schematic view showing the coordination of the inner gear ring composed of two rack sections and the two main planetary gear trains.

As shown in FIG. 9, the difference between the variable transmission of this Embodiment and that in Embodiment 1 is that the inner gear ring B is formed by two sections of rack 3 through the connection of both ends in ring-shaped form, wherein the rear section of the first section of the rack leads out from the gear ring connecting interface at the front end of the second section of the rack, the rear end of the second section of the rack leads out from the gear ring connecting interface at the front end of the first section of the rack, and two pairs of inner, outer planetary gears are equipped to balance the center of gravity for eliminating rotating vibration and to bear higher torque. In all the abovementioned embodiments, an inner gear ring with variable tooth-number is adopted. Such inner gear ring can not only be applied to the aforesaid variable transmission, but also to other shift or transmission mechanisms. For instance, through the engagement of the inner gear ring B with the outer planetary gear 13 of the planetary gear train, and driving by the revolution of the outer planetary gear 13, the rack is driven to push or draw out teeth 1 into or from the inner gear ring B after the outer planetary gear 13 passes through the gear ring connecting interfaces A during rotation. Meanwhile the two tapered discs 7, 8 are driven to make axial movement to change the adjacent distance, in this way, to keep the inner gear ring contacting the inner walls of the two tapered discs 7, 8 all the time, and closely contacting between the facing walls of the two tapered discs 7, 8 in the form of circular ring shape, the increase or decrease of tooth-number of the inner gear ring B is completed before the outer planetary gear 13 rotates to the gear ring connecting interfaces A for the next time.

What is claimed is:

1. An inner gear ring with variable tooth-number comprising a pair of tapered discs (7, 8) disposed coaxially and capable of changing axial distance through relative movement, wherein inward concave walls (9) of said two tapered discs (7, 8) are facing each other, a curled rack (3) composed of several teeth (1) is set between the two facing walls of the tapered discs (7, 8), cogs (2) are set on said teeth (1), a rear section (5) of the rack (3) consists of narrow teeth, a front section (4) of the rack (3) is composed of wide teeth is provided with gear ring connecting interfaces (A) for the access of the rear section (5) of the rack, the rear section (5) of the rack (3) passing through the connecting interfaces (A) forms a circular inner gear ring (B), wherein the gear ring connecting interfaces (A) on the first one or more wide teeth (6) is in the form of opening "n" with the height of the "n"-shaped wide teeth increasing from the first wide teeth, wherein the rear section (5) of the rack passes through the interface (A) at a tangent to the inner gear ring (B); two side surfaces of the inner gear ring (B) are closely contacted with the inward concave walls (9) of the two tapered discs (7, 8); the inward concave walls (9) of the two tapered discs are provided with concave faces (10) fit for the wide teeth, thus to make the inner gear ring (B) formed maintain a circular ring shape; the tooth-number of the inner gear ring (B) that the rear section (5) of the rack (3) is in or out of the inner gear ring (B) through the gear ring connecting interfaces (A) varies with the change of the relative distance of the two tapered discs (7, 8); the inner gear ring (B) is engaged with at least one planetary gear (13).

2. The inner gear ring with variable tooth-number as claimed in claim 1, characterized in that the inner gear ring (B) is composed of one or more sections of rack (3) through connection at both ends of the one or more sections of rack in ring-shaped form.

3. A method of varying the tooth-number for the inner gearing with variable tooth-number as claimed in claim 1, comprising steps of (i) engaging and driving the inner gear ring (B) by the planetary gear (13) of a planetary gear train through revolution, so that the rear section (5) of the rack (3) is driven to push teeth into or draw teeth out from the inner gear ring (B) after the planetary gear (13) passes through the gear ring connecting interfaces (A) during revolution, (ii) meanwhile driving the two tapered discs (7, 8) to make relative movement along the axial direction to change the adjacent distance, so as to ensure that the inner gear ring is contacted with the inner walls of the tapered discs all the time, and closely contacted between the facing walls of the two tapered discs (7, 8) in the form of circular ring shape, and (iii) completing the increase or decrease of tooth-number of the inner gear ring (B) before the planetary gear (13) passes through the gear ring connecting interfaces (A) during the next revolution.

4. A variable transmission using the inner gear ring with variable tooth-number of claim 1, comprising a main shift part and a shift mechanism, characterized in that the main shift part comprises at least a main planetary gear train driving the shift mechanism and containing an inner gear ring (B) with variable tooth-number, wherein the inner gear ring (B) with variable tooth-number forms the gear ring of the main planetary gear train, a transmission ratio of the main planetary gear train varies with the change of the tooth-number of the inner gear ring (B).

5. The variable transmission as claimed In claim 4, characterized in that the main planetary gear train comprises a main sun gear (11), an inner planetary gear (12) and an outer planetary gear (13); wherein the main sun gear (11) is coaxially disposed between the two tapered discs (7, 8), the inner planetary gear (12) is engaged with the main sun gear (11) through a bracket of a main planetary gear carrier (14); shafts of the inner and outer planetary gears (12, 13) are articulated via a planetary gear connecting arm (15) and the inner and outer planetary gears (12, 13) keep engaged with each other, the outer planetary gear (13) is engaged with the inner gear ring (B), the transmission ratio between the main planetary gear carrier (14) and the main sun gear (11) varies with the change of the tooth-number of the inner gear ring (B).

6. The variable transmission as claimed in claim 5, characterized in that the outer planetary gear (13) is directly engaged with the inner gear ring (B) through the resistance generated by loath and rotating centrifugal force, or through a supporting mechanism (D).

7. The variable transmission as claimed in claim 6, characterized in that the supporting mechanism (D) of the outer planetary gear consists of a supporting arm (16), a supporting sliding block (17) and a supporting sliding rail (17); one end of the supporting arm (16) is connected to the planetary gear connecting arm (15), the other end of the arm (16) is connected with the sliding block (18), the supporting sliding rail (17) can rotate around the axis of the tapered discs (7, 8), an included angle between the supporting sliding rail (17) and the axis of the tapered discs (7, 8) is equal to or similar to a semi-tapered angle of the inner wall (9) of the tapered disc (7 or 8) and moves axially with the tapered disc (7 or 8) of the same side; the sliding block (18) slides along the supporting sliding rail (17), and the outer planetary gear (13) is engaged with the inner gear ring (B) all the time.

8. The variable transmission as claimed in claim 5, characterized in that the main sun gear (11) is connected with a power input part (20); the main planetary gear carrier (14) is connected with a power output part (21), or the main sun gear (11) is connected with the power output part (21); the main planetary gear carrier (14) is connected with the power input part (20).

9. The variable transmission as claimed in claim 8, characterized in that a post planetary gear train (22) is configured between the planetary gear train and power output part (21); the post planetary gear train (22) is a single pinion type planetary gear train, and is composed of a sun gear (23), a gear ring (24) and a planetary gear carrier (25); the main sun gear (11) is connected with the sun gear (23), the main planetary gear carrier (14) is linked with the gear ring (24); the main sun gear (11) or main planetary gear carrier (14) is connected with the power input part (20), the planetary gear carrier (25) of the post planetary gear train (22) is connected with the power output part (21).

10. The variable transmission as claimed in claim 4, characterized in that the main planetary gear train comprises a main sun gear (11), an inner planetary gear (12) and an outer planetary gear (13); wherein the main sun gear (11) is coaxially disposed between the two tapered discs (7, 8); the inner planetary gear (12) is engaged with the main sun gear (11) through a bracket of a main planetary gear carrier (14); pinions (P) are connected with the outer planetary gears (13) coaxially; the shafts of the inner and outer planetary gears (12, 13) are articulated via a planetary gear connecting arm (15) and the inner planetary gear (12) is engaged with the pinions (P); the outer planetary gear (13) is engaged with the inner gear ring (B); the main planetary gear carrier (14) is connected with a power input part (20), and the main sun gear (11) is linked with a power output part (21).

11. The variable transmission as claimed in any one from claims 4 and 5-10, characterized in that a traction device is set between the shift mechanism and inner gear ring (B), wherein the traction device comprises a tooth guiding grooved rail (26) and a traction rod (27); the tooth guiding grooved rail (26) is arranged along the tangent direction of the inner gear ring (B) and connected with the first tooth (6) at the front section of the rack (3), and makes radial movement with the tooth (6); the traction rod (27) is arranged on a plane of a shaft section in the center of the inner gear ring (B) and along the direction with an arctan $(0.5/\pi)$ angle with the tooth guiding grooved rail (26), and connected with the narrow teeth at the rear section (5) of the rack (3), and moves along this direction under the traction of the shift mechanism; with the traction rod (27) movement along the setting direction, the rear section (5) of the rack through the gear ring connecting interfaces (A) by means of drawing out or pushing in teeth is in or out of the inner gear ring (B) via the sliding in the tooth guiding grooved rail (26), and drives the tooth guiding grooved rail (26) to make radial movement along the first tooth (6) at the front section of the rack so as to adapt to the change of the radius of the inner gear ring (B).

12. The variable transmission as claimed in claim 11, characterized in that screw holes are set in the tapered discs (7, 8), the screw holes are connected by screws (19) with opposite threads on both ends, wherein the screws (19) rotate along with the movement of the traction rod (27), and the relative distance between the two tapered discs (7, 8) varies with the rotation of the screws (19).

13. The variable transmission as claimed in claim 11, characterized in that the shift mechanism is a synchronous stepping shift mechanism (C) comprising driver plates (29, 30); round pins (31) are configured on the driver plates (29, 30); several grooves (28) fit for the round pins (31) are mounted on the traction rod (27), and the diameter of the round pins (31) rotating along with the driver plates (29, 30) is equal to the distance between the adjacent grooves (28).

* * * * *